United States Patent
Luo et al.

(10) Patent No.: US 7,784,028 B2
(45) Date of Patent: Aug. 24, 2010

(54) METHOD FOR MULTI-STANDARD SOFTWARE DEFINED RADIO BASE-BAND PROCESSING

(75) Inventors: Zhigang Luo, Shanghai (CN); Wei Li, Shanghai (CN); Yan Zhang, Shanghai (CN); Wei Guan, Shanghai (CN)

(73) Assignee: Alcatel Lucent, Paris (FR)

( * ) Notice: Subject to any disclaimer, the term of this patent is extended or adjusted under 35 U.S.C. 154(b) by 1796 days.

(21) Appl. No.: 10/896,877

(22) Filed: Jul. 23, 2004

(65) Prior Publication Data

US 2005/0027789 A1    Feb. 3, 2005

(30) Foreign Application Priority Data

Jul. 31, 2003   (CN) ................. 03 1 41970

(51) Int. Cl.
  G06F 9/44    (2006.01)
  H04M 1/00   (2006.01)
(52) U.S. Cl. ................. 717/120; 717/121; 717/163; 455/561
(58) Field of Classification Search .......... 717/120
  See application file for complete search history.

(56) References Cited

U.S. PATENT DOCUMENTS

| | | | | | |
|---|---|---|---|---|---|
| 5,448,735 | A | * | 9/1995 | Anderson et al. | 718/100 |
| 5,930,503 | A | * | 7/1999 | Drees | 713/1 |
| 7,143,407 | B2 | * | 11/2006 | Rajaram et al. | 717/173 |
| 7,151,925 | B2 | * | 12/2006 | Ting et al. | 455/418 |
| 2002/0024993 | A1 | | 2/2002 | Subramanian | |
| 2003/0008684 | A1 | * | 1/2003 | Ferris | 455/561 |
| 2003/0114163 | A1 | | 6/2003 | Bickle | |
| 2003/0174731 | A1 | * | 9/2003 | Tafazolli et al. | 370/469 |

FOREIGN PATENT DOCUMENTS

EP    1168647 A2    2/2002

OTHER PUBLICATIONS

J. Mitola, "The Software Radio Architecture", May 1, 2995, IEEE Communications Magazine, IEEE Service Center, New York, NY, US, pp. 268-238, XP00051876.
Luneau: "Flexcell-Deployment and Software Views", Proceedings of the SDR 2002 Technical Conference and Product Exposition, Dec. 31, 2002, pp. 1-7, XP002472585.

* cited by examiner

Primary Examiner—Lewis A Bullock, Jr.
Assistant Examiner—Hang Pan
(74) Attorney, Agent, or Firm—Fay Sharpe LLP

(57) ABSTRACT

A method for multi-standard Software defined radio (SDR) base-band processing is provided. The method comprises the steps of: constituting SDR software framework, which includes SDR kernel structure, SDR software modules, other application parts and an operating system; extracting protocol software modules of different standards and reclassifying them as dedicated system libraries, common system libraries and common algorithm libraries, and then storing them into the software modules; adding a scheduler to the SDR kernel structure, the scheduler structuring a concrete base-band application software module by the dedicated system libraries, common system libraries and common algorithm libraries, using Process and Sequence; and, defining SDR hardware platform, applying the concrete base-band application software which is structured by the scheduler on the SDR hardware platform, so as to complete concrete base-band processing of the wireless communication system.

11 Claims, 3 Drawing Sheets

US 7,784,028 B2

METHOD FOR MULTI-STANDARD SOFTWARE DEFINED RADIO BASE-BAND PROCESSING

CROSS-REFERENCE TO RELATED APPLICATION(S)

This application is based on the Chinese Patent Application No. 03141970.4 filed on Jul. 31, 2003, the disclosure of which is hereby incorporated by reference thereto in its entirety, and the priority of which is hereby claimed under 35 U.S.C. §119.

FIELD OF THE INVENTION

The present invention relates to a method for Software defined radio (SDR) base band processing, and more particularly, to a method for SDR base band processing used for many wireless communication standards such as WCDMA, CDMA2000, HSDPA, OFDM, and WLAN.

BACKGROUND OF THE INVENTION

Putting forward in recent years, the Software defined radio (SDR) technology is a new architecture for implementing wireless communication. It is mainly directed at some problems existing in the field of wireless communication, such as coexistence of multiple communication systems, fierce competition between various standards, and shortage of frequency resources. In particular, the development of wireless private communication systems results in that new systems are emerging one after another, product periods get shorter and shorter, it is hard for the previous wireless communication system relying mainly on hardware to be suited to such a situation, and thus, the concept of Software defined radio emerges as the times demand. Generally speaking, Software defined radio is an architecture that connects modularity and standardization functions of software together via a universal platform and is capable of accomplishing various wireless communication systems through software loading. Software defined radio achieves various functions in a wireless communication system by means of software, which is another revolutionary leap following the transition of radio station from analogue to digital. Software defined radio is even regarded as a super computer with antennas, which is capable of adjusting and changing a station's work frequency band, modulation and demodulation system, coding and decoding form, service type, data speed and format, encrypting mode, access control protocol etc by re-structuring and controlling software modules. A software module is comprised of various software algorithm libraries. By loading software algorithm or updating software version, the expansion function of services is achieved and a new communication standard can be employed.

Due to the characteristics of software per se, wireless communication system and apparatus based on the SDR technology is endowed with the following capabilities:

1. Capability of Reprogramming/Reconfiguring

SRD apparatus can be reprogrammed and reconfigured in a fast and simple way so as to support the application in various transmission fashions and the transmission or receiving at any frequency; the capability of reprogramming and reconfiguring results in the fact that an identical device supports different cell technologies, private communication systems and other wireless services applied in a worldwide scale.

2. Capability of Providing and Changing Services

By adopting a SDR apparatus, a user can use both traditional and new services; and the concept of air-loading software can guarantee the user the acquisition of the latest service.

3. Capability of Supporting Multiple Standards

SDR enables a wireless operator to achieve the system's version updating, standard updating etc without changing hardware of a base station. Additionally, a new wireless communication system is defined by software.

As seen from the current situation, various standards of the 3rd generation mobile communication system (WCDMA/CDMA2000/TD-SCDMA)will coexist. Thus, the development & research on a multi-standard mobile communication system/apparatus will greatly benefit manufacturers, operators and users. Such a multi-standard mobile communication system/apparatus uses a public hardware platform and achieves different functions/standards by loading different software. After a standard is upgraded, the whole communication system/apparatus can support the new standard simply by upgrading software correspondingly. Hence, it is of practical significance to research into the software framework, designing and development method of multi-standard SDR.

SDR software can be divided into control software and protocol software. Control software mainly performs the function of control, such as performing configuration, setting, management and the like with respect to a base station; while protocol software mainly realizes the function of the protocol corresponding to each standard. The SDR software framework shall possess the following properties Flexibility: possibility of processing multiple modes, multiple frequency-bands, multiple standards etc;

Reconfiguration: must being compatible with the existing main standards and capability of being upgraded in accordance with the standard conceivable in the future; Upgrading an identical standard and changing various standards can be achieved through reconfiguration;

Reusability: a software module should being reusable as much as possible. Different standards use an identical control module in the control part; and modules of similar functions are reused as much as possible in the protocol software part.

Currently there are two typical SDR software frameworks: one is SCA-based software framework adopted by SDR forum, the other is CCL/ITRI SDR software system.

1. SCA-based SDR Software Framework

At present, Software defined radio (SDR) forum prefers to use Common Object Request Broker Architecture (CORBA) platform and employ Software Communication Architecture (SCA) as the standard of software framework of SDR system. SCA provides a framework of SDR apparatus software which succeeds in using Common Design patterns. The software of SDR apparatus is comprised of control program and wireless application program. By taking CORBA as middleware, SCA provides a flexible environment for integrated dissimilar hardware and software written by multiple languages. As a standard developed for Joint Tactical Radio System, SCA employs CORBA for its distribution object structure, which leads to object-request broker (ORB) become a basic comprising part thereof. The interfaces of the object use interface definition language (IDL), and unified modeling language (UML) is used for illustrating an application example.

2. CCL/ITRI SDR Software Frameworks

Computer & Communications Research Labs/Industrial Technology Research Institute (CCL/ITRL) SDR software system is developed by CCL/ITRI. Providing an effective SDR software framework for CCL/ITRI SDR hardware, this framework can be realized both at terminal and base station sides, with the function including bootstrap of SDR system, stop of SDR system, configuration of SDR system, switching of SDR system mode and the like. In order to satisfy these high-level functional requirements of SDR system, this software architecture is divided into 6 parts which are: SDR kernel framework (SDR_CF), SDR software module manager (SDR_SMM), SDR software module, SDR hardware abstract layer (SDR_HAL), SDR hardware manager (SDR_HM) and SDR hardware module (SDR_HWM). This framework not only needs to be integrated with CCL/ITRI SDR hardware platform, but also shall be implemented in commercial off the shelf (COTS) operating system.

However, the existing art has the following disadvantages.

1. SCA

SCA system is applicable to the designing of relatively high-level software other than to base-band software. The initial purpose of developing SCA is for military radio system. Due to its military background, SCA has features that are not required for commercial application. As a mature structure CORBA is, it brings about problems in performance and flexibility to SDR system. High performance is vital to base-band software, whereas most of advantages provided by CORBA are of no use to base-band software. Therefore, the development of base-band software is generally not based on CORBA platform. Usually SDR hardware does not provide CORBA environment, thus resulting in a big problem in implementing CORBA.

2. CCL/ITRI SDR Software Systems

This software system is specially used for the hardware platform designed by CCL/ITRI. Moreover, software module of this software framework needs to be implemented within the kernel of operating system. Therefore, this software framework is not in common use.

The existing two SDR software frameworks put more attention to control part, but less involves software framework and method for designing and developing of protocol part.

SUMMARY OF THE INVENTION

With regard to the disadvantages existing in the current SDR software framework, the present invention provides a method for multi-standard Software defined radio (SDR) base-band processing.

A multi-standard software defined radio (SDR) base-band processing method, the method comprising the steps of:
  a) constituting SDR software framework, which includes SDR kernel structure, SDR software modules, other application parts and an operating system;
  b) extracting protocol software modules of different standards and reclassifying them as dedicated system libraries, common system libraries and common algorithm libraries, and then storing them into the software modules;
  c) adding a scheduler to the SDR kernel structure, the scheduler structuring a concrete base-band application software module by the dedicated system libraries, common system libraries and common algorithm libraries, using Process and Sequence;
  d) defining SDR hardware platform, applying the concrete base-band application software which is structured by the scheduler on the SDR hardware platform, so as to complete concrete base-band processing of the wireless communication system.

Wherein the dedicated system library is comprised of dedicated functions possessed by an air interface of a certain standard, the common system library comprises common functional modules in a processing link, and the common algorithm libraries comprise algorithm with a wide application in science and communication field.

step c) further comprises a step as defining the combination of one library component and some library components in the dedicated system library, the common system library and the common algorithm library as Task, and a step as defining one task Sequence consisting of a couple of tasks as one Process. The Process has the Process protocol description mainly describing which tasks a Process includes, which library components the tasks correspond to, on which apparatus the library components are arranged, the property of the library components and the corresponding library files.

Having completed defining task and Process, step c) further comprises the steps of:
  reading and analyzing Process description file, and then loading and arranging the library component required;
  the scheduler scheduling and executing one task;
  the scheduler releasing the task executed, and then selecting a successor and executing it;
  releasing Process after all tasks of one Process have been executed.

in step c), the scheduler can dynamically insert, modify and delete the base-band software module during operating protocol software. the scheduler may arrange the library components on one or a couple of hardware apparatuses in accordance with services requirements. If a new library component is added to the system library, it can replace an old library component with the new library component by modifying Process protocol description file.

The notable improvements of the present invention are as follows: adding a scheduler to the SDR kernel structure, by means of Process and Sequence, the scheduler structuring library components of the dedicated system libraries, common system libraries and common algorithm libraries into a concrete base-band application software module which is running on SDR base-band hardware platform, so as to complete relevant base-band processing. This method with strong flexibility can be applied to a multi-standard base-band processing. In addition, the method possesses reusability and reconfiguration of software.

BRIEF DESCRIPTION ON THE DRAWINGS

The accompanying drawings, which are incorporated in and constitute a part of the specification, illustrate embodiments of the invention and, together with the description, serve to explain the principles of the invention.

DESCRIPTION OF THE PREFERRED EMBODIMENTS

Figure 1:
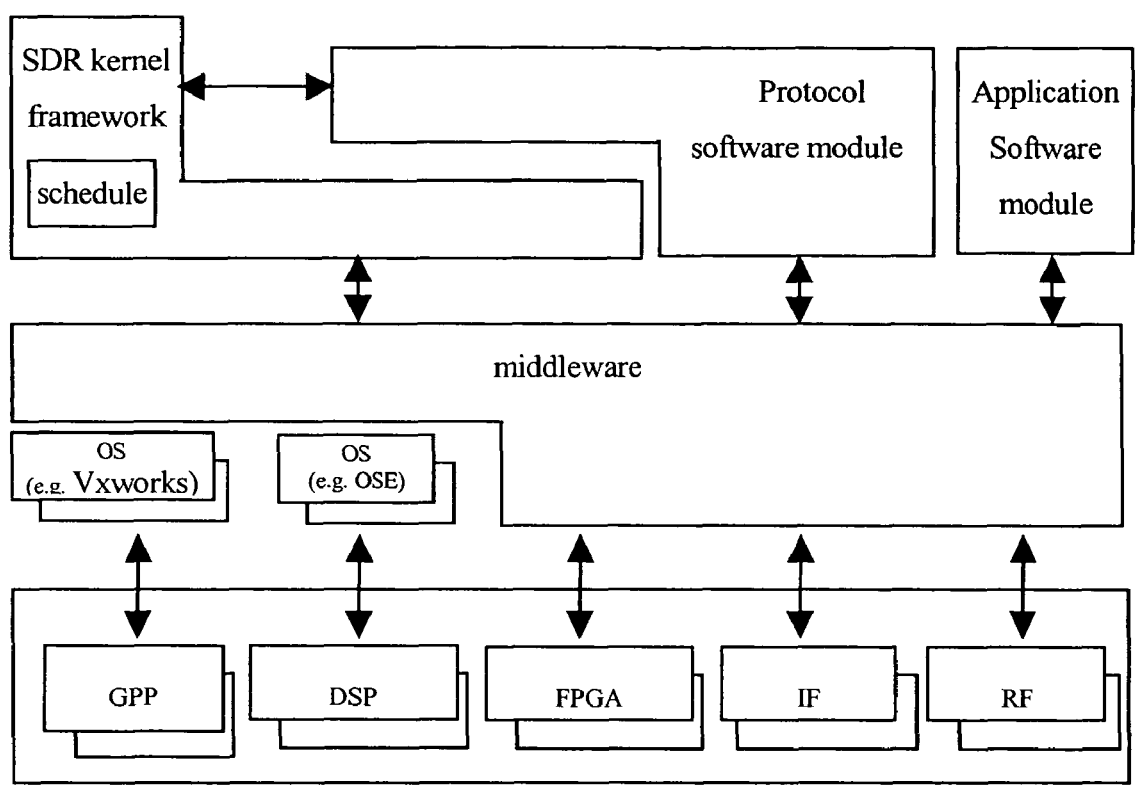
FIG. 1 shows a multi-standard SDR base-band software framework.

The preferred embodiments of the present invention will be described in detail in accordance with the accompanying drawings.

First, a SDR base-band software framework is constituted. Said SDR software framework comprises SDR kernel structure, SDR software modules, other application parts and an operating system, and the SDR kernel structure comprises a scheduler which controls and manages other comprising parts of a SDR manager, such as a configuration manager, a resources manager, a download manager and a monitor. The scheduler mainly performs instances and implements process. Operation defining of the scheduler is shown in table 1.

TABLE 1

| Name | Meaning |
|---|---|
| InstantiateProcess | Instantiate the process definition |
| ReleaseProcess | Release the process instance |
| ScheduleTask | Schedule the instance and select a ready task |
| ActivateTask | Allocate resources and activate task |
| DeactivateTask | Deactivate task |
| ExecuteTask | Execute task based on the task defination |
| ReleaseTask | Complete task and release resources |
| Synchronize | Synchronize task |
| SelectTask | Select successor task in accordance with conditions |
| SelectInstance | Select a Process instance and schedule |
| ReceiveMessage | Receive message |
| SendMessage | Send message |
| DispatchMessage | Dispatch message to Process instance |

Usually, the scheduler performs the following steps:
1) the scheduler reading and analyzing the Process description file, loading and arranging library components;
2) the scheduler selecting an instance (SelectInstance);
3) the scheduler starting to schedule Task (ScheduleTask);
4) the scheduler executing task (ExecuteTask);
5) the scheduler releasing task executed, and selecting a successor Task, then turning to 3), if there being no successor task, which indicates all operations have been completed and stop shall be processed, then turning to 6);
6) releasing process (ReleaseProcess).

If a task included in the Process changes, for example, the algorithm corresponding to the Task is updated during executing a Process, then the scheduler deactivates the Task (DeactivateTask) and schedules Activate Task (ActivateTask), and thus the Task is updated. The latest algorithm is scheduled during executing the Task, therefore, the scheduler can achieve the dynamical configuration of the system.

When running the system, relationships among the configuration manager, the resources manager, the download manager, the monitor and the scheduler are as follows:

When running the system, the monitor is responsible for monitoring the usage of all resources in the system and all states information of the system. If finding at the moment that the memory resources of the system are in tight use, the monitor reports the current usage information of the memory resources to the resources manager. Then, the resources manager re-arranges resources, for example, changes some software module's position and even requires using new software module. Then, the resources manager notifies the configuration manager to reconfigure, and then the configuration manager performs reconfiguration and generates new Process description file. If the configuration manager requires using new software module, it notifies the download manager to download software. Having completed configuration, the configuration manager notifies the scheduler to re-instantiate Process.

In order to achieve the object of the present invention, the present invention extracts protocol software modules of different standards and reclassifies them as dedicated system libraries, common system libraries and common algorithm libraries, and then stores them to the software modules.

Multi-standard protocol software module is the important part of the SDR-based multi-standard system. From the view of signal processing, base-band processing protocols have similarity very much and are just different in parameter setting. From the view of system, these protocol software modules of different standards can be extracted and reclassified as dedicated system libraries, common system libraries and common algorithm libraries.

In multi-standard SDR base-band software framework, the reusability of protocol software is achieved via library definition. By analyzing commonness and difference of various standards, protocol libraries can be defined as common libraries and dedicated libraries. With regard to the base-band processing part, software modules are mainly concentrated on base-band signal processing, namely executing Chip Rate processing, Symbol Rate processing, frame protocol processing etc at uplinks and downlinks. The present embodiment will divide software modules used for base-band signal processing in a multi-standard environment into three libraries, i.e., dedicated system libraries, common system libraries and common algorithm libraries.

Figure 2:
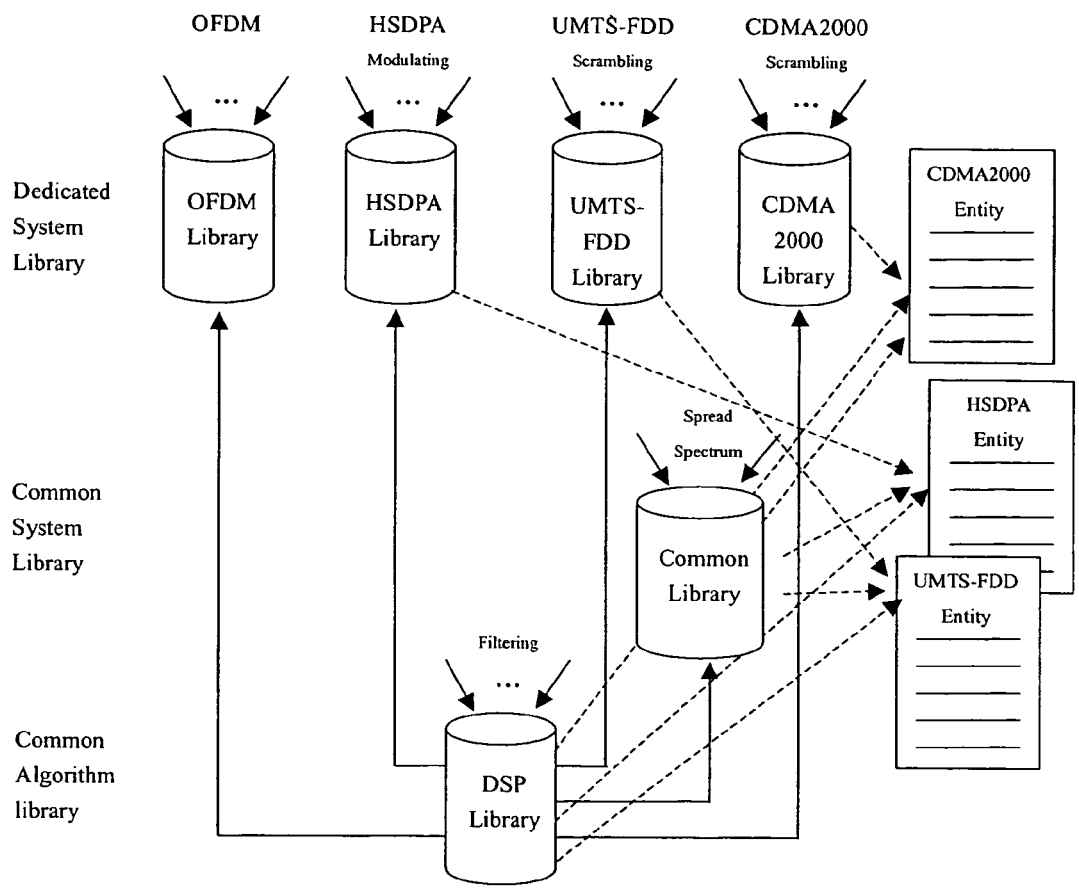
FIG. 2 shows a hierarchy SDR library used for base-band signal processing.

In hierarchy SDR libraries used for base-band signal processing as shown in FIG. 2, CDMA entity represents base-band processing of CDMA2000, which is formed by dedicated system libraries, common system libraries and common algorithm libraries (DSP libraries) of CDMA2000; HSDPA entity represents base-band processing of HSDPA, which is formed by dedicated system libraries, common system libraries and DSP libraries of HSDPA; and UMTS entity represents base-band processing of UMTS, which is formed by dedicated system libraries, common system libraries and DSP libraries of UMTS. Just as shown in FIG. 2 that each entity has three dotted lines pointing to it, base-band processing of each communication standard may need to call software modules in the three libraries. In addition, DSP libraries have lines pointing to other system libraries respectively, which represents that other system libraries may call software modules in DSP library.

The dedicated system libraries are comprised of modules with dedicated functions possessed by an air interface of a certain standard. Taking UMTS-FDD and HSDPA these two standards for example, 16QAM is exclusively possessed by HSDPA, while first interleaving is exclusively possessed by UMTS-FDD.

When the common system library is running in different standard systems simultaneously, software modules in the library is conducive to establishing common functional modules in processing links. For example, both standards of HSDPA and UMTS-FDD include CRC, spread spectrum, QPSK and other functional modules. These required components can be downloaded during establishing wireless links.

The common algorithm libraries include algorithm with a wide application in science and communication field, such as filter function, complex/real number FTT function, matrix function, logic, and vector computing function, in particular which can be realized in DSP.

The above-mentioned hierarchy SDR library can quickly find out software modules corresponding to the functions required. It provides an effective solution to the development of software modules and storage and management of a large number of software codes.

Then, SDR base-band hardware platform can be defined in accordance with SDR base-band software framework, said scheduler instantiate Process on the platform, and then form concrete base-band software to complete base-band processing.

It usually includes chip rate processing and symbol rate processing in base-band processing software. In some standards, such as HSDPA, a part of medium access control (MAC) is processed in base-band part. As to multi-standard base-band processing, it usually uses the same hardware platform and adds different base-band software to different standards. The same hardware platform (usually comprising of DSP and FPGA) can support base-band processing of different standards through downloading different software(libraries). For example, in order to support UMTS-FDD, it need download dedicated system library, common system library and some DSP algorithm libraries of UMTS-FDD and apply this in hardware platform.

Figure 3:
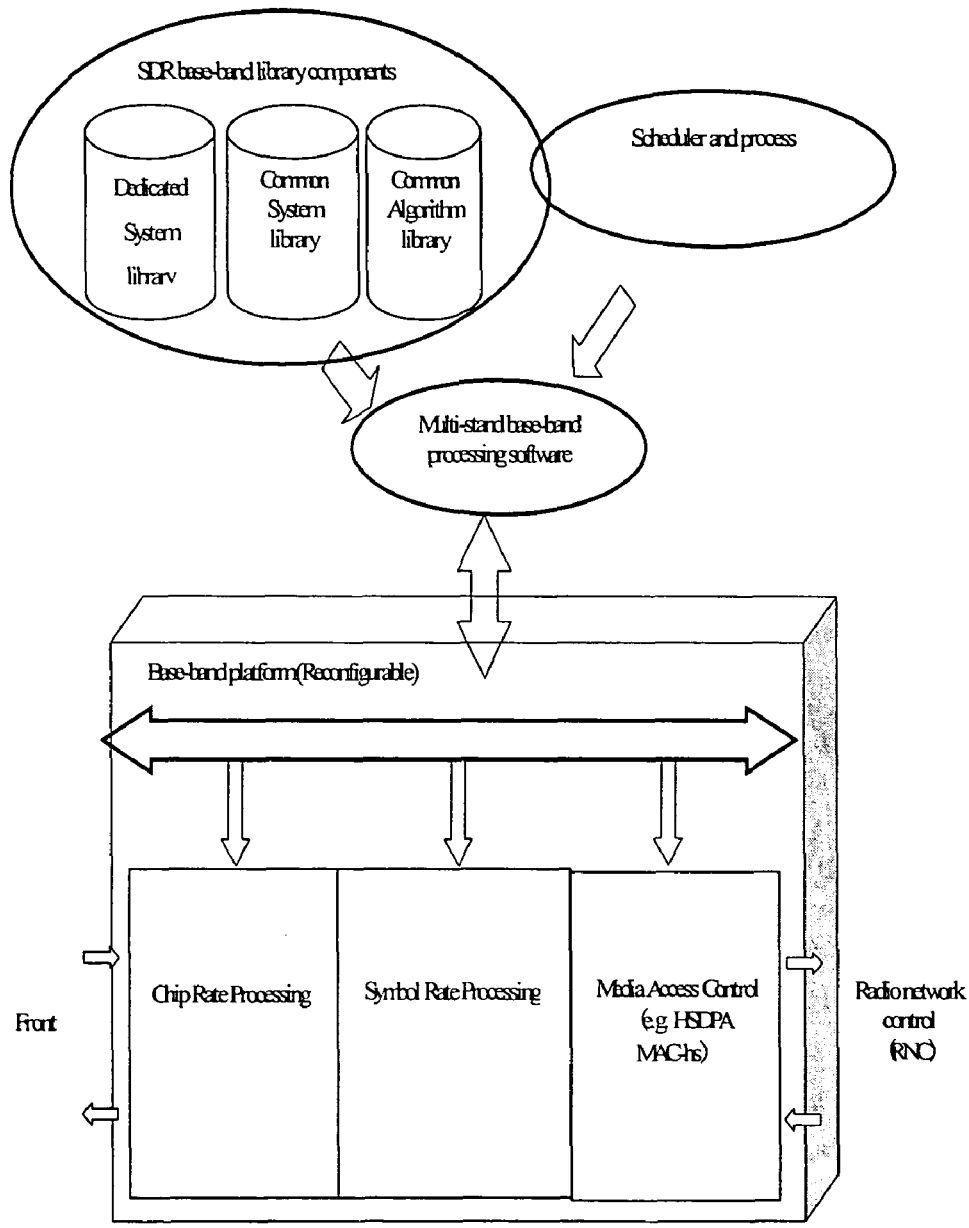
FIG. 3 shows a multi-standard base-band platform based on the concept of library and process.

As shown in FIG. 3, in order to constitute a concrete base band application software by the above-defined library components, such as base-band processing software in a UMTS-FDD downlink, via the scheduler added to said SDR kernel structure, it should constitute a concrete base-band application software module using library components in said dedicated system libraries, common system libraries and common algorithm libraries by the concept of Process and Sequence.

A Process is defined as a certain function comprised of a task Sequence, and a Task is defined as a combination of a library component or some library components. Process is a functional entity and is constituted by a series of Tasks, which is a basic functional unit. For example, all functions in downlink in wireless communication system are defined as a Process, wherein each functional block is defined as a library component as described above. Thus, each functional block (library component) can serve as a Task, or several library components serve as a Task. Then, the scheduler instantiates the Process and executes the Task so as to achieve base-band processing in downlink.

Embodiment 1

Hereinafter, it is provided a base-band processing method, which supports UMTS-FDD/HSDPA.

Through analyzing base-band processing protocol of UMTS-FDD and HSDPA, it can define common system library and dedicated system library as follows: table 2 is common system library, table 3 is dedicated system library of UMTS-FDD, and table 4 is dedicated system library of HSDPA.

TABLE 2

| | Library component | | parameter | |
|---|---|---|---|---|
| Common system library | CRC accessory | crclength | = 24 bit for HSDPA<br>= 24, 16, 12, 8, 0 bits for UMTS-FDD | |
| | Code/block partitioning | MaxcodelLength | = 5114 for HSDPA<br>= 5114, 504 for UMTS-FDD | |
| | Channel encoding | Codescheme | = Turbocode (R = 1/3) for HSDPA<br>= Conv code (R = 1/2, 1/3), Turbo code (R = 1/3) for UMTS-FDD | |
| | Physical channel partitioning | Input bit, R numphch, P | HSDPA/UMTS-FDD | |
| | Second interleaving (QPSK) | size (r2, c2) | (32, 30) for HSDPA<br>(r2, 30)  r2 $\geq$ U/c2 for UMTS-FDD | |
| | | Numbitinrf, U | = 960 for HSDPA<br>for UMTS-FDD | |
| | | Numinterleaver | = 1 | |
| | Physical channel mapping | Framelength | = 2 ms for HSDPA<br>= 10 ms for UMTS-FDD | |
| | Spread spectrum | Channel codes (sf, k) | sf = 16 for HS-PDSCH<br>0 $\leq$ k $\leq$ sf − 1<br>sf = 128 for HS-SCCH<br>0 $\leq$ k $\leq$ sf − 1<br>sf = 256 for HS-DPCCH<br>k = 1, 32, 64<br>sf = 256 for DPCCH<br>k = 0<br>sf = 4, 8, 16, 32, 64, 128, 256, (512) for DPDCH<br>k = sf/4 | HSDPA<br>UMTS-FDD<br>for DPCH |
| | | | Set in accordance with special channel | UMTS-FDD for common channel |
| | Irregularity | Scramblecode (type, length) | HSDPA/UMTS-FDD | |
| | QPSK modulation | Qpsk | HSDPA/UMTS-FDD | |
| | Pilot bit | pilot_bit | HSDPA/UMTS-FDD | |
| | Power control bit | tpc_bit | HSDPA/UMTS-FDD | |

TABLE 2-continued

| Library component | | parameter |
|---|---|---|
| Transmission format combination indication bit | tfci_bit | HSDPA/UMTS-FDD |

TABLE 3

| | Library component | parameter | |
|---|---|---|---|
| To dedicated system library of UMTS-FDD | Transmission block splicing | innumbits maxcodelength | =504 for Convcode =5114 for Turbocode |
| | First interleaving | tti size(r1, c1) | tti = 10, 20, 40, 80 ms C1 = 1, 2, 4, 8; r1 = Xi/c1 |
| | Code matching | | |
| | Wireless structure partitioning | innumbits outnumframes | |
| | Transmission channel multiplexing | trchnum trchsnum | |
| | First DTX indication inserting | unused | |
| | Second DTX indication inserting | unused | |

TABLE 4

| | Library component | Parameter | |
|---|---|---|---|
| Dedicated system library of HSDPA | Physical layer HARQ functionality | Maxsoftbits, $N_{IR}$ | Signal from high-hierarchy |
| | | harqin, $N^{TTI}$ | Signal from high-hierarchy |
| | | Rv(s, r) | Signal from high-hierarchy |
| | Second interleaving (16QAM) | size(r2, c2) numbitinrf, U numinterleaver 16qam | (32, 30) = 1920 for 16QAM = 2 |
| | 16QAM constellation recombination (IQ mapping) | | |
| | HS-SCCH encoding | tfri_bit | channelcodesetstream $(X_{ccs,1}, X_{ccs,2}, X_{ccs,3}, \ldots, X_{ccs,7})$ modulschemeinfo $(X_{ms,1})$ transblksizeinfo $(X_{tbs,1}, X_{tbs,2}, X_{tbs,3}, \ldots, X_{tbs,6})$ harqprocessinfo $(X_{hap,1}, X_{hap,2}, X_{hap,3})$ rvcoding $(X_{rv,1}, X_{rv,2}, X_{rv,3})$ newdataindicator $(X_{nd,1})$ ueid $(X_{ue,1}, X_{ue,2}, X_{ue,3}, \ldots, X_{ue,16})$ |
| | HS-DPCCH encoding 16QAM IQ demapping | harqackbits (h) cqibits $(X_{cqi,1}, X_{cqi,2}, X_{cqi,3}, X_{cqi,4}, X_{cqi,5})$ Demapping 16 qam | |

Based on the functions actually implemented in wireless communication system, a downlink of a UMTS-FDD can be defined as follows (i.e., process difining file):

Process_umts=(
task1 (cyclic redundancy code(CRC) accessory),
task2 (transmission block series/partitioning),
task3 (channel encoding),
task4 (rate mapping),
task5 (first insertion of DTX indicator),
task6 (first interleaving),
task7 (wireless structure partitioning),
task8 (TrCH multiplex technology),
task9 (second insertion of DTX indicator),
task10 (physical channel partitioning),
task11 (second interleaving),
task12 (physical channel mapping)

Wherein, the modules of transmission block series, first interleaving, rate matching, wireless structure partitioning, TrCH multiplex technology, first insertion of DTX indicator and second insertion of DTX indicator come from dedicated system library of UMTS-FDD, while other modules such as CRC accessory, channel encoding and physical channel matching come from common system library of UMTS-FDD/HSDPA.

Such a Process having a sequence of 12 Tasks which are in a simple relation of sequential executing is defined according to process description file format.

Hereinafter, the scheduler starts working.

First, the scheduler reads and analyzes Process description file, loads and arranges library component in accordance with description file. When the data rate borne by this downlink is relatively low (the resources required relatively scarce), these Tasks will usually be arranged on an identical apparatus (an identical DSP). When the data rate is very high (the resources required exceed the resources of one DSP), then the scheduler may arrange these 12 Tasks on different apparatuses. For example, task 1~task 3 are arranged on the same apparatus, while task 4~task 12 are arranged on another apparatus. When the data rate is much higher (the resources required exceed the resources of two DSPs), the scheduler may arrange these tasks on more apparatuses. Such a flexible arrangement is attributed to the fact that we divide one downlink into a sequence of tasks.

Then, the scheduler instantiates process.

The scheduler starts schedule task (ScheduleTask), that is, the scheduler monitors whether the task to be executed is ready, if it is ready, then the scheduler executes the task (ExecuteTask). When completing the task, the scheduler releases the executed task (ReleaseTask), and selects a successor task (SelectTask), and then continues to execute. If there is no successor task, which indicates that all operations of Process have been completed and stop shall be processed, then the scheduler releases Process (ReleaseProcess).

When one Process is being executed, if one task included in the Process changes, e.g., the algorithm corresponding to the task is updated, the system will inform the scheduler, then the scheduler deactivates the task (DeactivateTask), i.e., deactivates the taskthat has been loaded in the memory, and activates another task (ActivateTask), i.e., re-loads the task whose algorithm has been updated. Thus the scheduler employs the latest algorithm during executing the task, thereby, the dynamic configuration (configuration during operating) of the system is achieved.

The function of a certain software module changes due to the change of services requirements, for example, the encoding algorithm of Task 3 is upgraded, it only updates the library component channel encoding and modifies description file of Task 3. Thus, when the scheduler is executing Process_umts, only task 3 needs to be reloaded, while other modules remain unchanged. Hence, the object of dynamic configuration of the system is achieved.

Embodiment 2

Based on the function required by one downlink of HSDPA (HS-DSCH), the Process corresponding thereto may be defined as:

Process_hsdsch=(
   Task1 (CRC accessory),
   Task2 (code/block partitioning),
   Task3 (channel encoding),
   Task4 (physical layer HARQ functionality),
   Task5 (physical channel partitioning),
   Task6 (second interleaving (16QAM)),
   Task7 (16QAM constellation recombination),
   Task8 (physical channel matching)

Wherein, the modules of CRC accessory, channel encoding and physical channel matching come from common system library of UMTS-FDD/HSDPA, while the others come from dedicated system library of HSDPA. The using of common library makes it unnecessary to develop a similar part of different standards and thus, lowers the cost and shortens the period of product development.

The method for the scheduler to schedule task is the same as embodiment 1, and thus is not further described herein.

In addition, if the system is required to support a down rate greater than 2M, that is, the system needs to be switched from UMTS-FDD to HSDPA, then the scheduler unloads Process_umts and loads Process_hsdsch. Thus, the system completes switching from one standard to another standard. Process_hsdsch here requires not only common system library but also dedicated system library of HSDPA. If the apparatus is not provided with dedicated system library of HSDPA, the scheduler will inform the download manager of downloading the corresponding library file, while analyzing description file. Thus, the switching of the system may occur during operating the system.

When the resources of the apparatus are large enough, UMTS-FDD and HSDPA may co-exist in the same apparatus. When UMTS-FDD is required, Process-umts is loaded; when HSDPA is required, then Process-hsdsch is loaded.

As many apparently widely different embodiments of the present invention can be without departing from the spirit and scope thereof, it is to be understood that the invention is not limited to the specific embodiments thereof except as defined in the appended claims.

What is claimed is:

1. A multi-standard software defined radio (SDR) base-band processing method, characterized in that said method comprising the steps of:
   a) constituting SDR software framework, which includes SDR kernel structure, SDR software modules, other application parts and an operating system;
   b) extracting protocol software modules of different standards and reclassifying the modules based on the modules' relation to the different standards as dedicated system libraries, common system libraries and common algorithm libraries, and then storing them into the software modules;
   c) adding a scheduler to the SDR kernel structure, the scheduler structuring a concrete base-band application software module by the dedicated system libraries, common system libraries and common algorithm libraries, using a Process protocol description that describes which of the reclassified libraries and tasks correspond to signals to be processed on a SDR hardware platform;
   d) defining the SDR hardware platform, by applying the concrete base-band application software which is structured by the scheduler on the SDR hardware platform, so as to complete concrete base-band processing of the wireless communication system.

2. A multi-standard Software defined radio base-band processing method as defined in claim 1 characterized in that in step b), the dedicated is system library is comprised of dedicated functions possessed by an air interface of a certain standard.

3. A multi-standard Software defined radio base-band processing method as defined in claim 1, characterized in that in step b) the common system library comprises common functional modules in a processing link.

4. A multi-standard Software defined radio base-band processing method as defined in claim 1, characterized in that in step b), the common algorithm libraries comprise algorithm with a wide application in science and communication field.

5. A multi-standard Software defined radio base-band processing method as defined in claim 1, characterized in that step c) further comprises a step as defining the combination of one library component and some library components in said dedicated system library, said common system library and said common algorithm library as Task.

6. A multi-standard Software defined radio base-band processing method as defined in claim 5, characterized in that step c) further comprises a step as defining one task Sequence consisting of a couple of tasks as one Process.

7. A multi-standard Software defined radio base-band processing method as defined in claim 6, characterized in that the Process protocol description describes which tasks a Process includes, which library components said tasks correspond to, on which apparatus said library components are arranged, the property of the library components and the corresponding library files.

8. A multi-standard Software defined radio base-band processing method as defined in claim 7, characterized in that having completed defining task and Process, step c) further comprises the steps of: reading and analyzing Process description file, and then loading and arranging the library component required; said scheduler scheduling and executing one task; said scheduler releasing the task executed, and then selecting a successor and executing it; releasing Process after all tasks of one Process have been executed.

9. A multi-standard Software defined radio base-band processing method as defined in claim 8, characterized in that in step c), said scheduler can dynamically insert, modify and delete said base-band software module during operating protocol software.

10. A multi-standard Software defined radio base-band processing method as defined in claim 8, characterized in that said scheduler may arrange said library components on one or a couple of hardware apparatuses in accordance with services requirements.

11. A multi-standard Software defined radio base-band processing method as defined in claim 8, characterized in that if a new library component is added to the system library, it can replace an old library component with the new library component by modifying Process protocol description file.

* * * * *